United States Patent
Alidina et al.

(10) Patent No.: US 6,819,971 B1
(45) Date of Patent: Nov. 16, 2004

(54) FAST COMPUTATION OF OVERFLOW FLAG IN A BIT MANIPULATION UNIT

(75) Inventors: Mazhar M. Alidina, Allentown, PA (US); Alexander Goldovsky, Philadelphia, PA (US)

(73) Assignee: Agere Systems Inc., Allentown, PA (US)

( * ) Notice: Subject to any disclaimer, the term of this patent is extended or adjusted under 35 U.S.C. 154(b) by 950 days.

(21) Appl. No.: 09/602,555

(22) Filed: Jun. 23, 2000

(51) Int. Cl.$^7$ ................................................. G06F 7/38
(52) U.S. Cl. ........................ 700/160; 700/90; 708/525
(58) Field of Search ........................... 700/90, 96, 121, 700/160, 50, 51; 708/524, 620, 706, 11, 625, 209, 525; 712/20

(56) References Cited

U.S. PATENT DOCUMENTS 6,009,451 A  * 12/1999  Burns ......................... 708/525
6,370,558 B1 *  4/2002  Guttag et al. ................ 708/603

* cited by examiner

Primary Examiner—Kidest Bahta

(57) ABSTRACT

A bit manipulation unit (BMU) scales and formats data and includes fast computation of the overflow flag. For fast computation the BMU's overflow flag is computed based on the input data and the shift amount. The overflow flag is calculated separately as either a $LMV_{left}$ for an arithmetic shift left operation or $LMV_{right}$ for an arithmetic shift right operation. For an arithmetic shift left operation, $LMV_{left}$ may be computed by first adding one plus the number of guard bits in the input data to the shift amount, and then detecting the number of redundant sign bits. For an arithmetic shift right operation, $LMV_{right}$ may be computed by checking the input redundant sign bits plus the right shift amount. By computing the overflow flag separately as $LMV_{left}$ and $LMV_{right}$ for arithmetic left and right shifts, respectively, the overflow flag LMV is determined in parallel with the barrel shift operation and so does not depend on the result from the barrel shift operation. Consequently, an advantage of employing this technique in a BMU may be a relative reduction in the time necessary for a BMU to calculate the overflow flag.

8 Claims, 4 Drawing Sheets

ARITHMETIC SHIFT RIGHT

ARITHMETIC SHIFT LEFT

LOGICAL SHIFT RIGHT

FAST COMPUTATION OF OVERFLOW FLAG IN A BIT MANIPULATION UNIT

BACKGROUND OF THE INVENTION

1. Field of the Invention

The present invention relates to circuits for digital signal processing systems, and, more particularly, detecting the overflow flag of a barrel shift operation.

2. Description of the Related Art

Bit manipulation units (BMUs) are circuits commonly employed in digital signal processors (DSPs), microcontrollers, or other types of processors to scale and format data. Typical instructions executed by a BMU include: (a) arithmetic shift left or right, (b) logical shift right, and (c) normalize. Pseudo-code equations (1) through (4) below represent these operations:

| | | |
|---|---|---|
| aD0=aS0>>aS1 | /*arithmetic shift right */ | (1) |
| aD0=aS0<<aS1 | /*arithmetic shift left */ | (2) |
| aD0=aS0>>>aS1 | /*logical shift right */ | (3) |
| aD0=norm(aS0,aD1) | /*normalize */ | (4) | where aD0 and aD1 represent resulting output data written to corresponding destination accumulators, and aS0 and aS1 represent input data stored in corresponding source accumulators. For an arithmetic shift right operation, redundant sign bits are shifted in from the left, while for a logic shift right operation, padding bits (logic "0" or logic "1") are shifted in from the left. For an arithmetic shift left operation, padding bits are inserted from the right. For a BMU, an operation for logical shift left is generally not defined since a logical shift left operation generates the same numerical result as an arithmetic shift left operation.

A BMU executes one operation in one clock cycle. In the DSP16000 processor available from Lucent Technologies of Murray Hill, N.J., for example, the source and destination accumulators are 40 bits wide; each accumulator may contain up to 32 bits of data and eight guard bits for overflow, and have a maximum shift amount of 31 bits. FIGS. 1(a), 1(b), and 1(c) illustrate changing bit positions for the three shift operations of equations (1), (2), and (3), respectively, in the exemplary prior art processor. For the normalize operation of equation (4), the BMU shifts the bits of the 40-bit input data an appropriate shift amount (number of bit positions) to represent the value with a 32-bit result and an exponent.

FIG. 2 shows logic circuit 200 for an exemplary implementation of a prior art BMU 201 and external accumulator 202. The circuit 200 has three primary input values: (a) the data aS0, which is a sequence of bit values, (b) the shift value, which is the direction (indicated by the sign bit of the shift value) and number of bit positions by which the data is to be shifted corresponding to the shift amount, and (c) the saturation mode value SAT. The saturation mode value SAT identifies whether the output values are to be limited to a 32-bit sequence. The data aS0 is provided to BMU 201 from, for example, 40-bit wide first source accumulator included in external accumulator 202. The shift value may be the shift value aS1 that is provided to BMU 201 from the upper half of a second source accumulator, that may be included in external accumulator 202, or the shift value may be an immediate value from the instruction itself. The shift value aS1 may be limited to 6 bits by limiter 210. The saturation mode value SAT is provided from an external control register (not shown) that is set by an instruction. If the saturation mode value SAT is enabled, as described subsequently, then a result generated by BMU 201 may be limited to a length of 32 bits. In addition, the input value SHIFT identifies whether an arithmetic/logic shift operation or a normalize operation is to be performed.

The circuit 200 has three primary output values: (a) two 40-bit results aD0 and aD1 written to external accumulator 202 (or other register file), and (b) an overflow flag LMV that is set and written to a status register (not shown). The input value SHIFT applied to multiplexer (mux) 211 selects either 1) the shift value from limiter 210 for an arithmetic shift left or right operation or 2) the shift amount for a normalize operation that is generated by exponent/compare module 205. Barrel shifter 203 performs a shift, either left or right, of the input data aS0 based on the decoded input SV from mux 211. Barrel shifter 203 may include a decoder to translate the value SV from mux 211 into 1) the number of bit positions to shift the input data aS0 and 2) whether to shift the input data aS0 left or right.

The result aD0 is the output of a barrel shift operation applied to the input sequence aS0 by barrel shifter 203, where the sequence length of the result may be limited by saturate module 204. When the overflow flag LMV is not set, the result aD0 may be represented with 32-bits, and so limiting the result from barrel shifter 203 with saturate module 204 is not necessary (SAT is in a "don't care" state).

When the overflow flag LMV is set, the result aD0 may not be represented with 32 bits (i.e., an overflow occurs). Whether a 32-bit or 40-bit result aD0 is written to the external accumulator is determined by the output signal of AND gate 208 applied to saturate module 204. AND gate 208 generates as an output signal the logical AND of 1) the overflow flag LMV and 2) the saturation mode value SAT. If saturation mode value SAT is enabled, then the output of AND gate 208 causes saturate module 204 to limit the result aD0 to the range 0xff80000000 to 0x007fffffff (Hex). If saturation mode value SAT is disabled, then the output of AND gate 208 causes saturate module 204 to pass the entire 40-bit result aD0 to the external accumulator 202.

For the normalize operation, the BMU 201 shifts the input bits by an appropriate shift amount to represent the value with 32-bits. The shift amount is referred to as the "exponent" and the result aD1 is the exponent for the normalize operation. The (e.g., 6-bit) exponent is generated by exponent/compare module 205 based on the input data aS0, and exponent/compare module 205 also generates the logical overflow value LLV component of the overflow flag LMV (described below).

The overflow flag LMV is a value comprising two components. The first component is the logical overflow value LLV determined by exponent/compare module 205. Exponent/compare module 205 compares the 6-bit value SV from the mux 211 to the 6-bit exponent generated for the input data aS0. The exponent also indicates the number of redundant sign bits in the input data aS0. If the shift value is greater than the number of redundant sign bits, a logical overflow has occurred, and exponent/compare module 205 sets the logical overflow value LLV to one. For the described exemplary implementation of the prior art, the logical overflow value LLV is only set to one on left shifts and, by definition, is set to zero on right shifts. The second component of the LMV, sometimes referred to as the math overflow value, is determined after the input has been shifted. A test determines if the bits in the positions corresponding to the guard bits and the most significant bit of the input data aS0, such as bits 39 to 31 in the exemplary embodiment, and the result aD0 are not all the same. Compare module 212 applies the test to the output aD0 prior to application to saturate block 204, and the overflow flag LMV is set when the test determines the bits are not the same. As shown in FIG. 2, the overflow flag LMV is generated by OR gate 209 as a logic OR of 1) the logical overflow value LLV and 2) the math overflow value of the compare module 212. In some implementations, the logical overflow value LLV is a separate flag and the LMV is only set if all of the guard bits are not the same as bit 31.

SUMMARY OF THE INVENTION

The present invention relates to faster computation of the overflow flag LMV in a bit manipulation unit (BMU). For fast computation, the overflow flag is computed based on the input data and the shift amount. The overflow flag is calculated separately as either a $LMV_{left}$ for an arithmetic shift left operation or $LMV_{right}$, for an arithmetic shift right operation. Calculation of $LMV_{left}$ and $LMV_{right}$ for an exemplary embodiment may be as follows. For an arithmetic shift left operation, $LMV_{left}$ may be computed by first adding one plus the number of guard bits in the input data to the shift amount, and then detecting the number of redundant sign bits. Hence, for an arithmetic shift right operation, $LMV_{right}$, may be computed by combining the total number of redundant sign bits in the input data with the shift amount since a shift right essentially adds more sign bits. By computing the overflow flag separately as $LMV_{left}$ and $LMV_{right}$ for arithmetic left and right shifts, respectively, the overflow flag LMV is determined in parallel with the barrel shift operation and so does not depend on the result from the barrel shift operation. Since calculation of the overflow flag is part of the critical path of computation in, for example, a BMU, an advantage of the present invention may be a relative reduction in the time necessary for a BMU to calculate the overflow flag.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with exemplary embodiments of the present invention, a bit manipulation unit (BMU) generates the overflow flag for an operation using fast computation of the overflow flag in shift left and shift right operations, rather than for math and logical overflow values. The overflow value is computed only for arithmetic shift left and right operations, since for other BMU operations, the overflow flag is set to zero.

Figure 3:
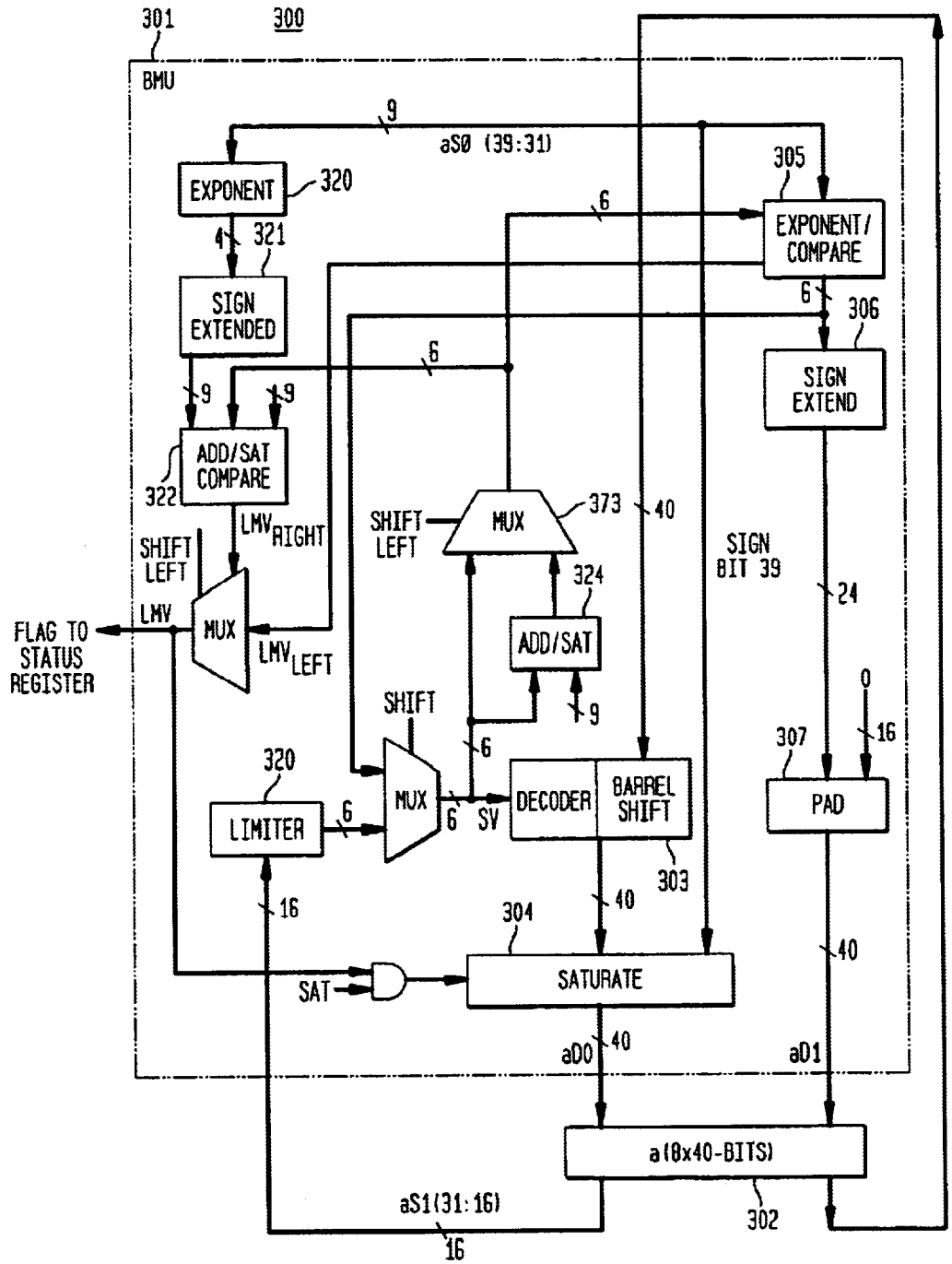
FIG. 3 shows a logic circuit for an exemplary implementation of a BMU in accordance with the present invention.

FIG. 3 shows a circuit 300 for an exemplary implementation of a BMU 301 and external accumulator 302 operating in accordance with an embodiment of the present invention. Inputs to circuit 300 include (a) the data aS0, which is a sequence of bit values, (b) the shift value aS1, which is the number of bit positions by which the data is to be shifted, and (c) the saturation mode value SAT. The data aS0 is provided to BMU 301 from, for example, a 40-bit wide first source accumulator included in external accumulator 302. The shift value aS1 may be limited to 6-bits by limiter 310. The saturation mode value SAT is provided from an external control register (not shown) that is set by the processor. If the saturation mode value SAT is enabled, then the result generated by BMU 301 may be limited to a length of 32 bits. In addition, external input signals SHIFT and SHIFT LEFT may be generated by a controller (not shown in FIG. 3). The input value SHIFT identifies whether an arithmetic/logical shift (left or right) operation or a normalize operation is to be performed, and the signal SHIFT LEFT identifies whether the operation is an arithmetic shift left (SHIFT LEFT set) or an arithmetic shift right (SHIFT LEFT not set).

Circuit 300 generates: (a) two 40-bit results aD0 and aD1 written to external accumulator 302 (or other register file), and (b) an overflow flag LMV generated in accordance with the embodiment of the present invention described subsequently. The input value SHIFT applied to multiplexer (mux) 311 selects either 1) the shift value from limiter 310 for an arithmetic shift left or right operation or 2) the shift of the normalize operation generated by exponent/compare module 305. Barrel shifter 303 performs a shift, either left or right, of the input data aS0 based on the decoded input SV from mux 311. Barrel shifter 303 may include a decoder to translate the value SV from mux 311 into 1) the number of bit positions to shift the input data aS0 and 2) whether to shift the input data aS0 left or right.

The result aD0 is the result of a barrel shift operation by barrel shifter 303, where the length of the result may be limited, if enabled, by saturate module 304. When the overflow flag LMV is not set, the barrel shifted result may be represented in 32 bits and limiting by saturate module 304 is not necessary (SAT is in a "don't care" state).

When the overflow flag LMV is set, the barrel shifted result may not necessarily be represented in 32 bits, (i.e., an overflow occurs). Whether a 32-bit or 40-bit result aD0 is written to the external accumulator is determined by logic AND gate 308 in response to the logic AND of the overflow flag LMV and the saturation mode value SAT. If saturation mode value SAT is enabled, then the output of AND gate 308 causes saturate module 304 to limit the result aD0 to the range 0xff80000000 to 0x007fffffff (Hex). If saturation mode value SAT is disabled, then the output of AND gate 308 causes saturate module 304 passes the entire 40-bit result aD0 to the external accumulator 302.

For the normalize operation, the BMU 301 shifts the input bits an appropriate shift amount to represent the value with 32 bits, where the result aD1 is the exponent for the normalize operation. The (e.g., 6-bit) exponent is generated by exponent/compare module 305 based on the input data aS0 and the output from mux 323.

Generation of the overflow flag LMV by BMU 301 is now described. In accordance with the exemplary implementation shown in FIG. 3, two separate quantities are generated: $LMV_{LEFT}$ representing an overflow value for an arithmetic shift left operation and $LMV_{RIGHT}$ representing an overflow value for an arithmetic shift right operation. The two quantities $LMV_{LEFT}$ and $LMV_{RIGHT}$ are provided to multiplexer (mux) 325 that selects either $LMV_{LEFT}$ or $LMV_{RIGHT}$ as the output overflow flag LMV based on the signal SHIFT LEFT.

For an arithmetic shift left operation, the overflow flag LMV of BMU 301 may be set two ways: 1) if the shift amount is greater than the number of redundant sign bits, or 2) if the bits corresponding to the guard bits and the most significant bit (MSB) of the barrel shift operation result (e.g., bits 39 to 31 of the result aD0 of the exemplary implementation) are not all the same. An equivalent method of computing the overflow flag LMV for an arithmetic left shift operation is to first add one plus the number of guard bits (e.g., nine for the exemplary implementation described subsequently) to the shift amount aS1, and then detect the number of redundant sign bits. This method indicates if a redundant sign bit has been shifted off or if the "next" (e.g., nine) bits of the input aS0 are shifted into the guard positions of the result aD0. This component of the overflow flag for an arithmetic shift left operation is referred to herein as $LMV_{LEFT}$, and $LMV_{LEFT}$ may be generated with a comparison in exponent/compare module 305 of BMU 301 by implementing the following pseudo-code:

```
100     if(number of redundant sign bits > (9 + shift amount)){
101             LMV_LEFT=0;
102     }else{
103             LMV_LEFT=1;
104     }
```

For the exemplary implementation of FIG. 3, exponent/compare module 305 computes $LMV_{LEFT}$ using the output value of mux 323. 6-bit adder/saturator 324 adds nine to the shift amount provided by mux 311 based on the signal SHIFT. Mux 323 is employed by BMU 301 to select, based on the signal SHIFT LEFT, either 1) the shift amount SV from mux 311 for either an arithmetic shift right, logic shift right, or normalize operations; or 2) the output value of 6-bit adder/saturator 324 for an arithmetic shift left operation.

For an arithmetic shift right operation, BMU 301 needs to determine if a set of most significant bits (the quantity of one plus the number of guard bits, and, e.g., the most significant bits 39 to 31 of the exemplary implementation) in the output result of barrel shifter 303 are not all the same. The total number of redundant sign bits in the result after the barrel shift operation of barrel shifter 303 is the number of redundant sign bits in the input aS0 plus the shift amount since a shift right adds sign bits. If the number of sign bits in the input is added to the shift amount and the total is less than one plus the number of guard bits (e.g., nine bits for the exemplary implementation), then an overflow occurs for the operation. If an overflow occurs, the result for this case sets the overflow flag $LMV_{RIGHT}$ to one; otherwise, $LMV_{RIGHT}$ gets set to zero. The value for $LMV_{RIGHT}$ may be generated by the following pseudo-code:

```
110     if(number of redundant sign bits + shift amount) ≧ 9 {
111             LMV_RIGHT=0;
112     }else{
113             LMV_RIGHT=1;
114     }
```

Circuit 300 generates $LMV_{RIGHT}$ as follows. The guard bits plus the MSB of the input data aS0 from external accumulator 302 (i.e., aS0 [39:31]) are applied to exponent module 320 to compute the 4-bit value for the exponent. Sign-extend module 321 prepends two bits representing the sign to the 4-bit value to generate a 6-bit value for the exponent. The 6-bit value for the exponent represents the number of redundant sign bits in the input data aS0. The 6-bit value for the exponent generated by sign-extend module 321 is then added to the shift amount provided from mux 323 by add, saturate, and compare (ADD/SAT/compare) module 322. ADD/SAT/compare module 322 compares the number of total redundant sign bits to the total number of guard bits (e.g., 9-bits) to determine whether to set $LMV_{RIGHT}$ as zero or one. The output of ADD/SAT/compare module 322 is provided to mux 325. Mux 325 selects either $LMV_{LEFT}$ or $LMV_{RIGHT}$ as the overflow flag LMV output by BMU 301 to a status register (not shown) based on the signal SHIFT LEFT.

Figure 1A:
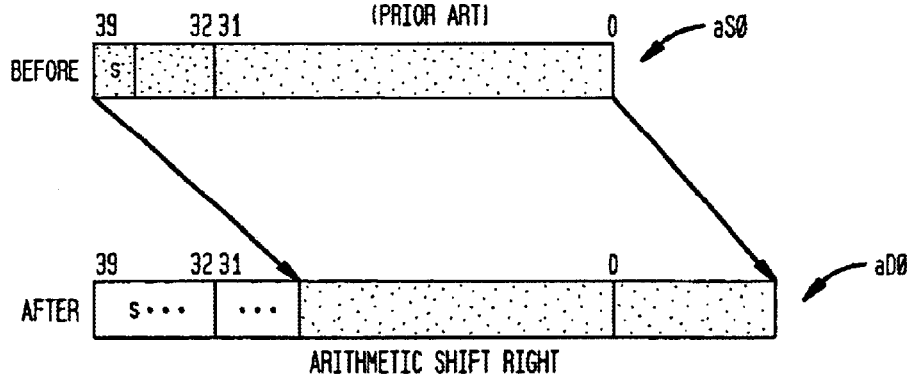
FIG. 1(a) illustrates changing bit positions for an arithmetic shift right operation of a bit manipulation unit (BMU) in a prior art processor.
Figure 1B:
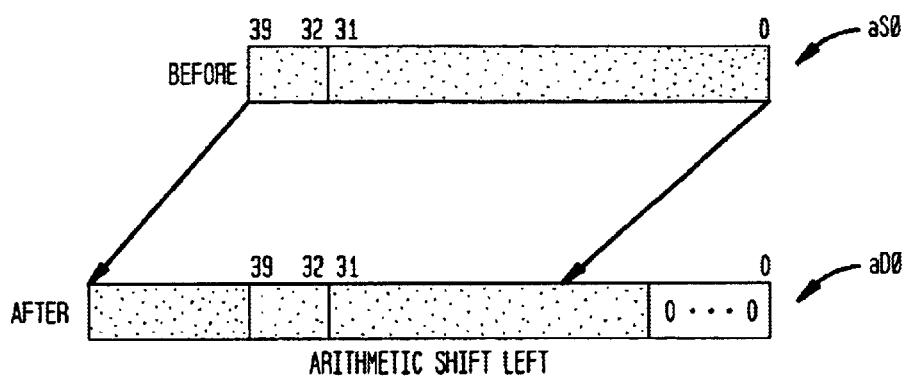
FIG. 1(b) illustrates changing bit positions for an arithmetic shift left operation of a bit manipulation unit (BMU) in a prior art processor.
Figure 1C:
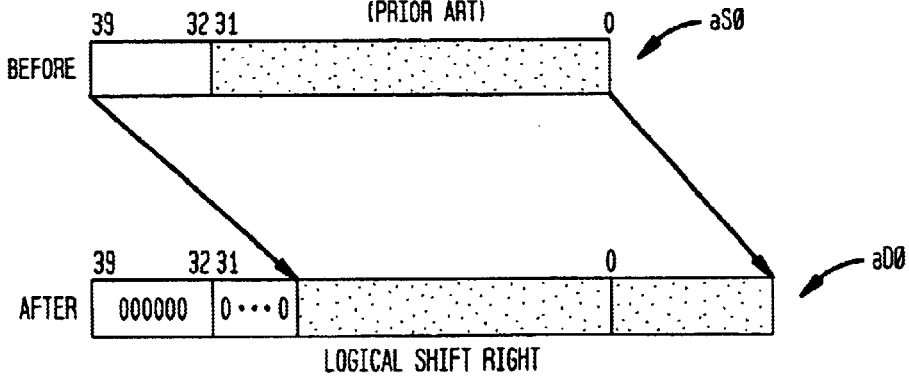
FIG. 1(c) illustrates changing bit positions for a logical shift right operation of a bit manipulation unit (BMU) in a prior art processor.
Figure 2:
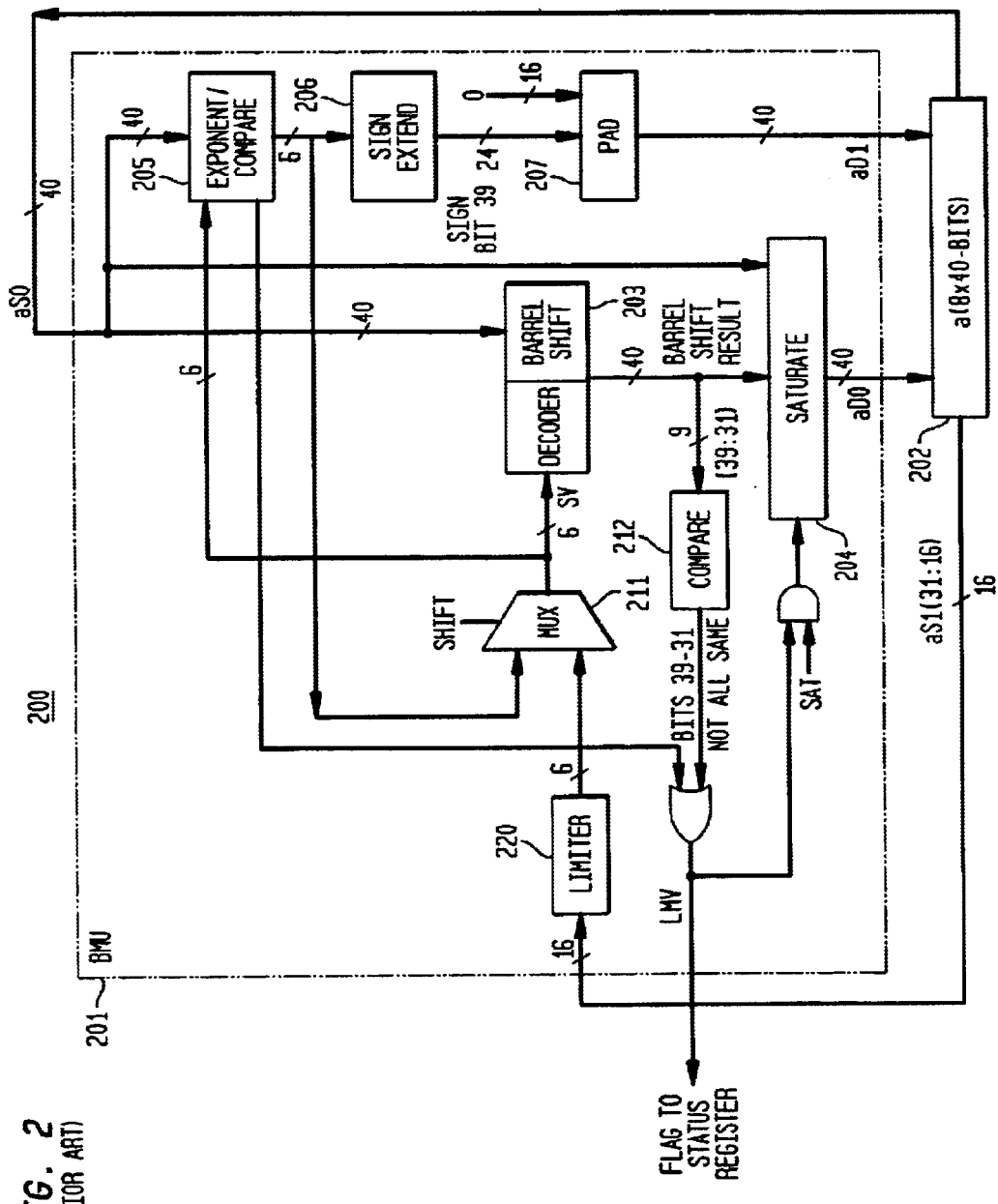
FIG. 2 shows logic circuit for an exemplary implementation of a prior art bit BMU and external accumulator.
Figure 4A:
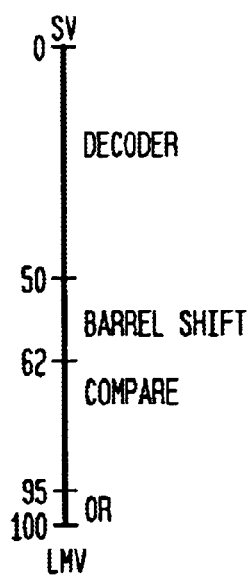
FIG. 4(a) shows the normalized, relative circuit delay for steps generating the value of LMV for the prior art circuit of FIG. 2.
Figure 4B:
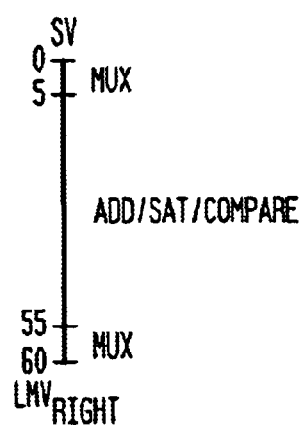
FIG. 4(b) shows the normalized, relative circuit delay for steps generating the value of $LMV_{right}$ for the arithmetic shift right operation for the circuit of FIG. 3.
Figure 4C:
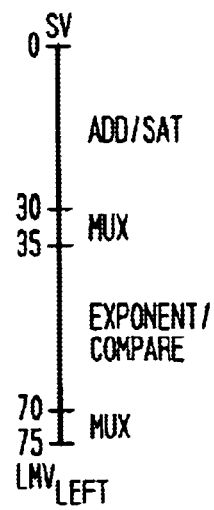
FIG. 4(c) shows the normalized, relative circuit delay for steps generating the value of $LMV_{left}$ for the arithmetic shift left operation for the circuit of FIG. 3.

A BMU operating in accordance with an exemplary embodiment of the present invention may provide the following advantages. FIG. 4(a) shows the normalized, relative circuit delay for steps generating the value of LMV for the prior art circuit 200 of FIG. 2. FIGS. 4(b) and 4(c) show the normalized, relative circuit delays for steps generating the value of LMV for the arithmetic shift right and arithmetic shift left operations for the circuit 300 of FIG. 3. Comparing FIG. 4a with FIGS. 4b and 4c, the circuit 300 exhibits at least a 25-percent improvement in speed over the prior art circuit 200 of FIG. 2. Furthermore, since a BMU only performs one operation per clock cycle, the additional logic added in an implementation may be shared by other processor functions, and thus a BMU may be optimized for area occupied in an integrated circuit. For instance, the 6-bit adder/saturator 324 of FIG. 3 may be shared and its inputs multiplexed depending on shift right or shift left operations.

While the present invention is described for a BMU having 40-bit wide external accumulators and allowing for 32-bit representation of results, 8 guard bits, and maximum shift amounts of 31, the characteristics of the described implementation are exemplary only. One skilled in the art would recognize that the present invention is not so limited and the techniques described herein may be extended to other lengths and types of input data, for any size accumulator, to different numbers of guard bits, and to different shift amounts. The present invention may also be extended to other types of operations that may be executed by a BMU.

While the exemplary embodiments of the present invention have been described with respect to methods or processes of circuits, the present invention is not so limited. As would be apparent to one skilled in the art, various functions may also be implemented in the digital domain as processing steps in a software program. Such software may be employed in, for example, a digital signal processor, microcontroller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for setting an overflow flag based on a shift value and input data for one of a plurality of operations executed in a bit manipulation unit (BMU), the apparatus comprising:

a first logic circuit, for a first subset of the plurality of operations, setting a first overflow value based on the left shift value and the input data, wherein the first logic circuit comprises:

a saturator forming a combination of the number of most significant bits (MSBs) of the input data and the shift value, the most significant bits corresponding to bits at positions for a set of guard bits in the input data and at least one bit of the input data; and an exponent/compare module comparing a number of redundant sign bits based on the combination, the exponent/compare module setting the first overflow value based on the comparison;

a second logic circuit, for a second subset of the plurality of operations, setting a second overflow value based on the right shift value and the input data, wherein the second logic circuit comprises:

an exponent module generating an exponent for the input data, the exponent module including means for prepending a sign to the exponent to generate a value corresponding to a number of redundant sign bits;

a combiner combining the shift amount with the value corresponding to the number of redundant sign bits to form a combined value;

a comparator generating the comparison as the difference between the combined value and the most significant bits of the input data wherein the second overflow value is set based on the comparison; and a selector providing either the first or the second overflow value as the overflow flag based on a signal identifying the one of the plurality of operations executed by the BMU.

2. The apparatus as recited in claim 1, wherein the apparatus is embodied as a circuit.

3. The apparatus as recited in claim 2, wherein the circuit is embodied in an integrated circuit.

4. The apparatus as recited in claim 1, wherein the apparatus is embodied in either a digital signal processor, microprocessor, micro-controller, or application-specific integrated circuit.

5. A method of setting an overflow flag based on a shift value and barrel-shifted input data for one of a plurality of operations executed in a bit manipulation unit (BMU), the method comprising the steps of:

(a) for a first subset of the plurality of operations, setting a first overflow value based on the left shift value and the input data, wherein step (a) comprises the steps of:

(a1) forming a combination of the number of most significant bits (MSBs) of the input data and the shift value, the most significant bits corresponding to bits at positions for a set of guard bits in the in input data and at least one bit of the input data;

(a2) comparing a number of redundant sign bits based on the combination, exponent, and (a3) setting the first overflow value based on the comparison;

(b) for a second subset of the plurality of operations, setting a first overflow value based on the right shift value and the input data, wherein step (b) comprises the steps of:

(b1) generating an exponent for the input data, (b2) prepending a sign to the exponent to generate a value corresponding to a number of redundant sign bits;

(b3) combining the shift amount with the value corresponding to the number of redundant sign bits to form a combined value;

(b4) generating the comparison as the difference between the combined value and the most significant bits of the input data, wherein the second overflow value is set based on the comparison; and (c) selecting either the first or the second overflow value as the overflow flag based on a signal that identifies the one of the plurality of operations executed by the BMU.

6. The method as recited in claim 5, wherein the method is embodied in a processor in an integrated circuit.

7. The method as recited in claim 5, wherein the method is embodied in a processor of either a digital signal processor, microprocessor, micro-controller, or application-specific integrated circuit.

8. A computer-readable medium having stored thereon a plurality of instructions, the plurality of instructions including instructions which, when executed by a processor, cause the processor to implement a method for setting a overflow flag based on a shift value and barrel-shifted input data for one of a plurality of operations executed in a bit manipulation unit (BMU), the method comprising the steps of:

(a) for a first subset of the plurality of operations, setting a first overflow value based on the left shift value and the input data, wherein step (a) comprises the steps of;

(a1) forming a combination of the number of most significant bits (MSBs) of the input data and the shift value, the most significant bits corresponding to bits at positions for a set of guard bits in the input data and at least one bit of the input data;

(a2) comparing a number of redundant sign bits based on the combination, exponent, and (a3) setting the first overflow value based on the comparison;

(b) for a second subset of the plurality of operations, setting a second overflow value based on the right shift value and the input data, wherein step (b) comprises the steps of:

(b1) generating an exponent for the input data, (b2) prepending a sign to the exponent to generate a value corresponding to a number of redundant sign bits;

(b3) combining the shift amount with the value corresponding to the number of redundant sign bits to form a combined value;

(b4) generating the comparison as the difference between the combined value and the most significant bits of the input data, wherein the second overflow value is set based on the comparison; and (c) selecting either the first or the second overflow value as the overflow flag based on a signal that identifies the one of the plurality of operations executed by the BMU.

\* \* \* \* \*